(12) United States Patent
Kinoshita et al.

(10) Patent No.: US 7,696,648 B2
(45) Date of Patent: Apr. 13, 2010

(54) INCOMING CURRENT SUPPRESSION DEVICE

(75) Inventors: Sadayuki Kinoshita, Chiyoda-ku (JP); Kenji Kamei, Chiyoda-ku (JP); Tomohito Mori, Chiyoda-ku (JP); Hiroki Ito, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 77 days.

(21) Appl. No.: 12/051,498

(22) Filed: Mar. 19, 2008

(65) Prior Publication Data

US 2009/0097173 A1 Apr. 16, 2009

(30) Foreign Application Priority Data

Oct. 16, 2007 (JP) ............................. 2007-268847

(51) Int. Cl.
*H01H 47/00* (2006.01)
*H01H 47/02* (2006.01)
(52) U.S. Cl. ...................................... 307/125; 361/159
(58) Field of Classification Search ................. 307/125, 307/129; 361/159
See application file for complete search history.

(56) References Cited

U.S. PATENT DOCUMENTS 5,563,459 A * 10/1996 Kurosawa et al. ........ 307/141.4
6,493,203 B1 * 12/2002 Ito et al. ..................... 361/159
7,095,139 B2 * 8/2006 Tsutada et al. .............. 307/129
7,259,947 B2 * 8/2007 Kinoshita et al. ............. 361/85

FOREIGN PATENT DOCUMENTS

| JP | 2004-208394 (A) | 7/2004 |
| JP | 2006-040566 (A) | 2/2006 |

* cited by examiner

*Primary Examiner*—Albert W Paladini
*Assistant Examiner*—Michael Rutland Wallis
(74) *Attorney, Agent, or Firm*—Buchanan Ingersoll & Rooney PC

(57) ABSTRACT

A control unit of an electric power supply system causes, responsive to a closing command signal, a switch corresponding to R phase to be thrown at a timing when a stationary magnetic flux and a residual magnetic flux of R phase are coincident with each other and then subsequently causes other switches corresponding to S phase and T phase to be thrown at a timing which is delayed from a zero point of an alternating voltage of R phase by a predetermined phase angle of 0-30 degrees, such that the difference of the stationary magnetic flux and the residual magnetic flux of each of S phase and T phase is minimum. Therefore, an exciting incoming current which flows into a three-phase transformer at a time of throwing a three-phase breaker provided with inter-pole capacitors can be suppressed.

4 Claims, 4 Drawing Sheets

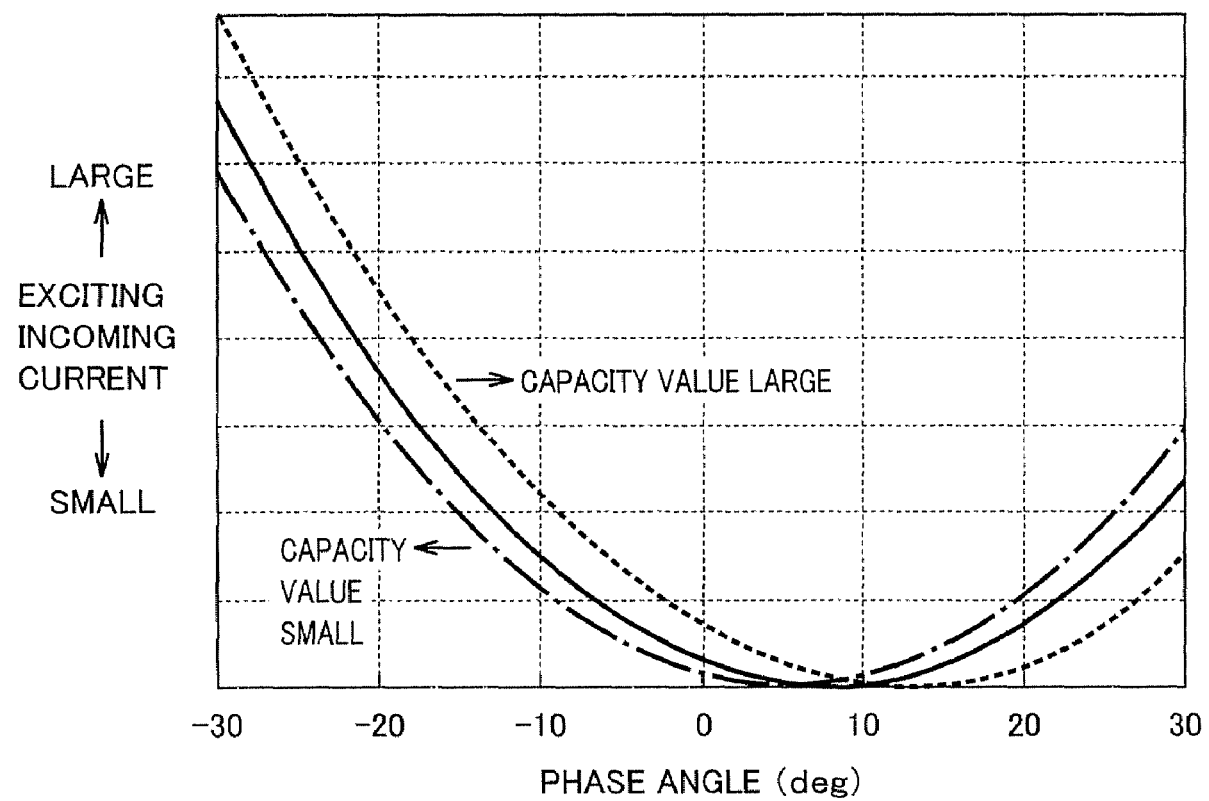

INCOMING CURRENT SUPPRESSION DEVICE

BACKGROUND OF THE INVENTION

1. Field of the Invention

The present invention relates to an incoming current suppression device, particularly to the incoming current suppression device which suppresses an exciting incoming current flowing from a three-phase AC power supply into a three-phase transformer through a three-phase breaker.

2. Description of the Background Art

Conventionally it is known that a transient current, which refers to an exciting incoming current, flows from the three-phase AC power supply to the three-phase transformer when throwing the three-phase breaker. The exciting incoming current becomes several times to ten times larger than the rated current of the three-phase transformer and causes instantaneous drop of the three-phase alternating voltage and the like.

As a method of suppressing the exciting incoming current, a method is known where a residual magnetic flux of each phase of the three-phase transformer is detected, and the alternating voltage of a reference phase is thrown at a timing when a stationary magnetic flux and the residual magnetic flux of the reference phase are coincident with each other, followed by throwing the alternating voltages of two remaining phases at the timing when the alternating voltage of the reference phase becomes 0 (for example, see Japanese Patent Laying-Open Nos. 2004-208394 and 2006-040566.)

In the conventional incoming current suppression method, it is a precondition that the stationary magnetic flux and the residual magnetic flux of each remaining phase are coincident with each other at the timing when the alternating voltage of the reference phase becomes 0.

However, in a case where an interpole capacitor is connected in parallel to each of three switches included in the three-phase breaker, the three-phase alternating voltage is supplied to the three-phase transformer through the three interpole capacitors even if the three switches are opened. For this reason, the residual magnetic flux of each phase of the three-phase transformer is the magnetic flux of a direct-current component on which the magnetic flux of a commercial frequency component is superposed.

Therefore, the residual magnetic fluxes of the two remaining phases are not always substantially the same at the time of throwing the reference phase, even if the direct-current components of the residual magnetic fluxes of the two remaining phases are substantially the same. If the two remaining phases are thrown at the above-mentioned timing under the state where the residual magnetic fluxes of the two remaining phases have some difference, the stationary magnetic flux and the residual phase of the two remaining phases will not be coincident with each other and thus a large exciting incoming current will flow.

SUMMARY OF THE INVENTION

Hence a primary purpose of the present invention is to provide the incoming current suppression device which can suppress the exciting incoming current that flows into the three-phase transformer at the time of throwing the three-phase breaker provided with the interpole capacitors.

The incoming current suppression device of the present invention is the incoming current suppression device which suppresses the exciting incoming current that flows from the three-phase AC power supply into the three-phase transformer through the three-phase breaker, the three-phase breaker including three switches and three interpole capacitors. One terminals of the three switches receive the alternating voltages of three phases from the three-phase AC power supply, respectively, and other terminals are connected to three input terminals of a three-phase primary winding of the three-phase transformer, respectively, the three interpole capacitors are connected in parallel to the three switches, respectively. The stationary magnetic flux is generated at each phase of the three-phase transformer when the three-phase breaker is closed, while the residual magnetic flux is generated at each phase of the three-phase transformer when the three-phase breaker is opened. This incoming current suppression device includes provided with a voltage measuring unit, a residual magnetic flux operation unit, and a control unit. The voltage measuring unit measures the voltage of the other terminal of the switch corresponding to the reference phase of the three phases. The residual magnetic flux operation unit determines the residual magnetic flux of the reference phase of the three-phase transformer based on the measurement result from the voltage measuring unit at the time when the three-phase breaker is opened. The control unit, responsive to a closing command signal, causes the switch corresponding to the reference phase to be thrown at the timing when the stationary magnetic flux of the reference phase and the residual magnetic flux determined by the residual magnetic flux operation unit are coincident with each other, then subsequently causes the two remaining switches to be thrown at the timing which is delayed from the zero point of the alternating voltage of the reference phase by a predetermined phase angle of between 0-30 degrees, such that the difference between the stationary magnetic flux of and the residual magnetic flux at each phase other than the reference phase is minimum.

With the incoming current suppression device according to the present invention, the switch corresponding to the reference phase is thrown at the timing when the stationary magnetic flux of the reference phase and the residual magnetic flux are coincident with each other, then subsequently the two remaining switches are thrown at the timing which is delayed from the zero point of the alternating voltage of the reference phase by the predetermined phase angle of between 0-30 degrees such that the difference between the stationary magnetic flux and the residual magnetic flux at each phase other than the reference phase is minimum. Therefore, the exciting incoming current which flows into the three-phase transformer at the time of throwing the three-phase breaker with the interpole capacitors can be suppressed, because the residual magnetic flux and the stationary magnetic flux of the reference phase are coincident with each other and the difference between the residual magnetic flux and the stationary magnetic flux of the remaining phases each is minimum.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows the relation between the throwing phase angle of the switches of S phase and T phase shown in FIG. 1 and the exciting incoming current.

DESCRIPTION OF THE PREFERRED EMBODIMENTS

Figure 1:
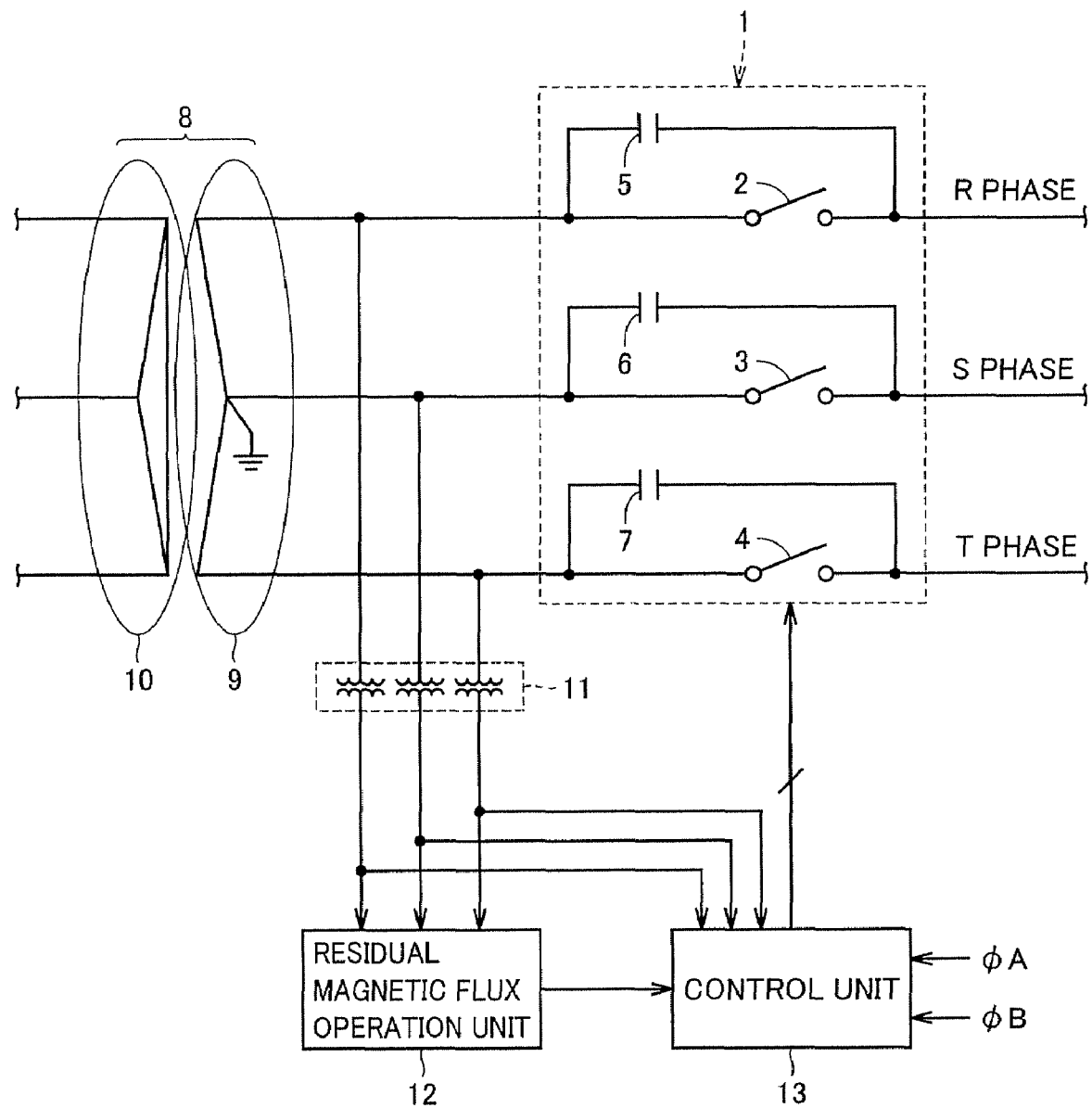
FIG. 1 is a circuit block diagram showing the principal part of the electric power supply system according to an embodiment of the present invention.

FIG. 1 is a circuit block diagram showing the principal part of the electric power supply system according to an embodiment of the present invention. This electric power supply system in FIG. 1 is provided with a three-phase breaker 1 and a three-phase transformer 8. Three-phase breaker 1 breaks the electric power supply to protect the electric power supply system and the like, when some accident occurs to the electric power supply system, and includes three switches 2-4 and three interpole capacitors 5-7.

One terminals of switches 2-4 receives the alternating voltages of R phase, S phase, and T phase from the three-phase AC power supply (not shown), respectively. Each of three switches 2-4 is independently controllable. During the normal operation, switches 2-4 are closed and the electric power is supplied. When some accident occurs to the electric power supply system, switches 2-4 are opened and the electric power supply is broken.

Interpole capacitors 5-7 are connected in parallel to three switches 2-4, respectively. Interpole capacitors 5-7 are provided for the purpose of mitigating the increasing rate of the transient recovery voltage (TRV) at the time of a short-line-fault breaking and the like.

Three-phase transformer 8 steps down the three-phase alternating voltage supplied from the three-phase AC power supply to a desired voltage to provide for a load, and includes a star-connected, neutral grounding three-phase primary winding 9 and a delta-connected three-phase secondary winding 10. Three input terminals of three-phase primary winding 9 are connected to the other terminals of switches 2-4 respectively. Three output terminals of secondary three-phase winding 10 are connected to the load (a three-phase motor, for example). Note that the stationary magnetic flux is generated at each phase of the three-phase transformer when the three-phase breaker is closed, while the residual magnetic flux is generated at each phase of the three-phase transformer when the three-phase breaker is opened.

Moreover, this electric power supply system is provided with a voltage measuring unit 11, a residual magnetic flux operation unit 12, and a control unit 13 Voltage measuring unit 11 continuously measures the instantaneous value of the voltage of the other terminals of switches 2-4 (i.e., three input terminals of three-phase primary winding 9 of three-phase transformer 8). The measurement values of voltage measuring unit 11 are provided to residual magnetic flux operation unit 12 and control unit 13. Residual magnetic flux operation unit 12 integrates the measurement values from voltage measuring unit 11 before and after three-phase breaker 1 is opened, and determines the residual magnetic flux of each phase of three-phase transformer 8.

Control unit 13, responsive to an opening command signal φA, opens three switches 2-4 simultaneously at the zero point where the alternating voltage of the reference phase of the three phases (referred to as R phase here) changes from plus to minus. Thereby, the direct-current component of the residual magnetic flux of R phase of three-phase transformer 8 is set to a predetermined positive value K, and the direct-current component of the residual magnetic flux of S phase and T phase can be set to approximately −K/2.

Moreover, control unit 13, responsive to a closing command signal φB, causes switch 2 corresponding to R phase to be thrown at the timing when the stationary magnetic flux of R phase and the residual magnetic flux determined by residual magnetic flux operation unit 12 are coincident with each other, and subsequently the remaining switches 3 and 4 are thrown at the timing which is delayed from the zero point of the alternating voltage of R phase by the predetermined phase angle of between 0-30 degrees, such that the difference between the stationary magnetic flux and the residual magnetic flux of each of S phase and T phase is minimum.

Moreover, control unit 13 generates therein a sinusoidal wave signal synchronized with the three-phase alternating voltage, according to the measurement value from voltage measuring unit 11 at the time when three-phase breaker 1 is closed, and based on the sinusoidal wave signal, determines the zero point timing of each phase, the value of the stationary magnetic flux, the timing when the stationary magnetic flux and the residual magnetic flux are coincident with each other, and the timing which is delayed from the zero point of each phase by a predetermined phase angle of θ.

Note that "closing" of switches 2-4 refers to that contacts of switches 2-4 mechanically touch. A predetermined period of closing time will be needed after control unit 13 instructs switches 2-4 to close before switches 2-4 actually close. In addition, it is known that some current will begin to flow due to a pre arc before switches 2-4 close at breaker 1. "Throwing" switches 2-4 refers to allow some current due to the pre arc flow to switches 2-4. A predetermined period of throwing time will be needed after control unit 13 instructs switches 2-4 to close before switches 2-4 are actually thrown. Moreover, a predetermined period of opening time will be needed after control unit 13 instructs switches 2-4 to open before switches 2-4 are actually opened. Control unit 13 controls switches 2-4 at the above-mentioned timing in consideration of the above-mentioned closing time, throwing time, and opening time.

Additionally, opening command signal φA and closing command signal φB are output from an accident detector for example, which detects any occurrence and restoration of accidents of the electric power supply system. Moreover, residual magnetic flux operation unit 12 and control unit 13 are configured with computers and the like.

Figure 2A:
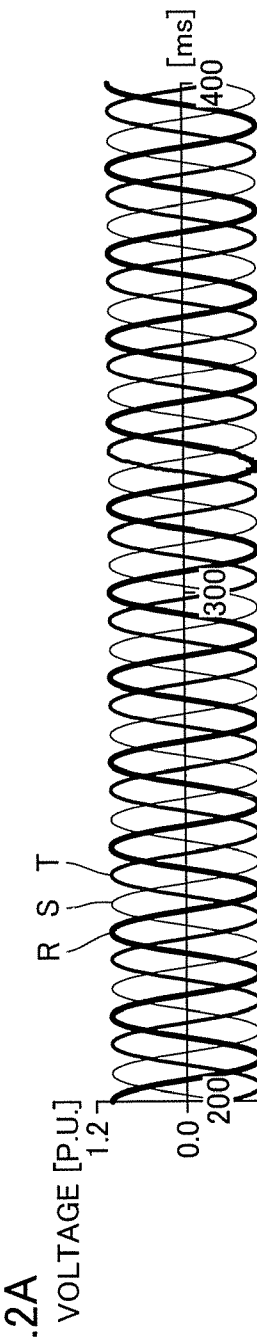
FIG. 2A-FIG. 2D are the time charts for explaining the exciting incoming current suppression method of the electric power supply system shown in FIG. 1.
Figure 2B:
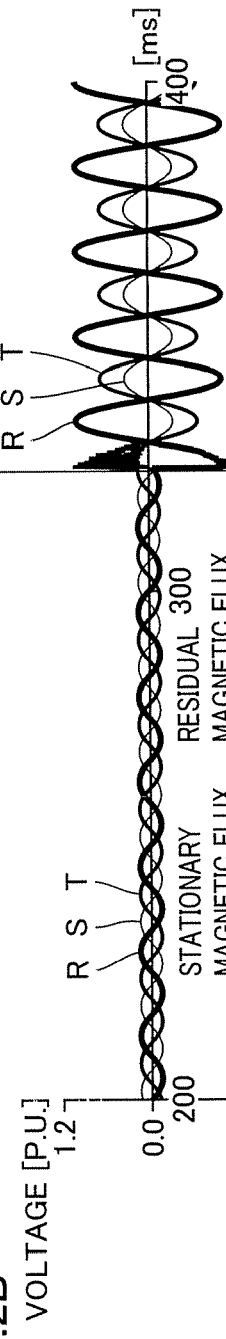
Figure 2C:
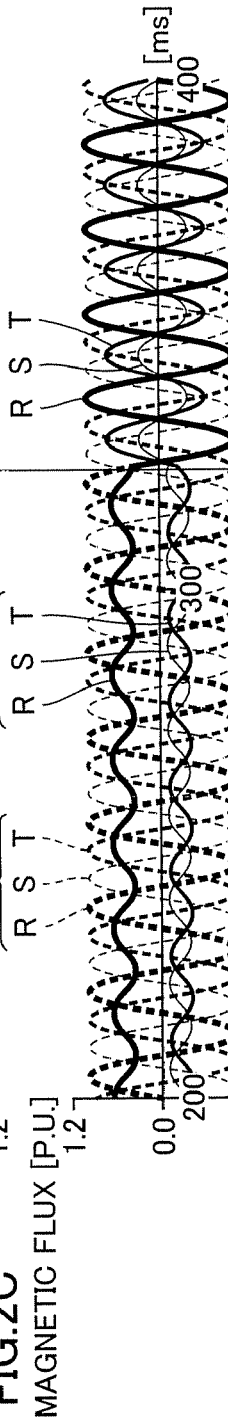
Figure 2D:
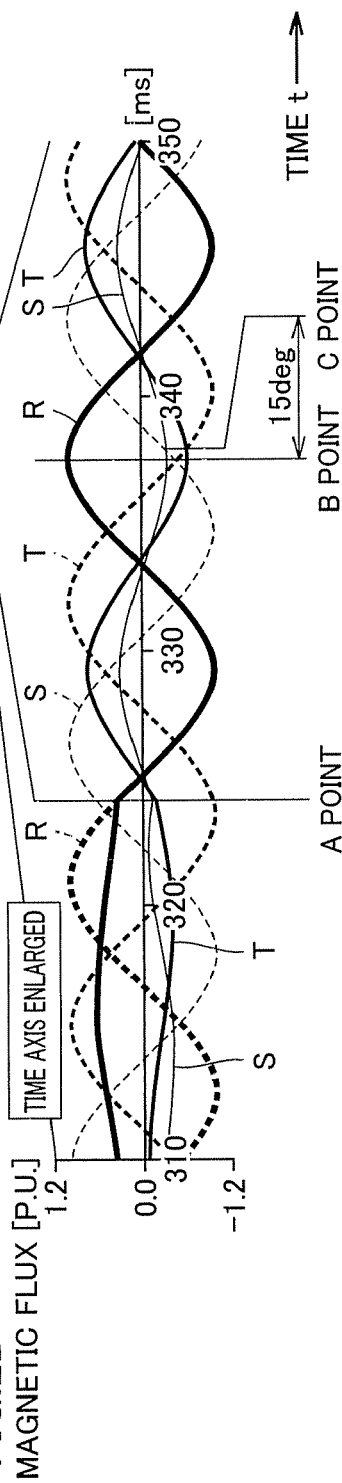

FIG. 2A-FIG. 2D are the time charts for explaining the incoming current suppression method of the electric power supply system shown in FIG. 1. Particularly FIG. 2A shows a waveform of the three-phase alternating voltage generated by the three-phase AC power supply, and FIG. 2B shows a waveform of an input voltage of three-phase transformer 8 measured by voltage measuring unit 11. Moreover, FIG. 2C shows, by solid lines, the residual magnetic flux of each phase of three-phase transformer 8, obtained by time-integrating the input voltage of three-phase transformer 8 shown in FIG. 2B with residual magnetic flux operation unit 12, while it also shows, by dotted lines, the stationary magnetic flux of each phase of three-phase transformer 8, obtained by time-integrating the three-phase alternating voltage shown in FIG. 2A. Moreover, FIG. 2D shows an expanded time axis of FIG. 2C.

In the case where switches 2-4 are closed, the three-phase alternating voltage shown in FIG. 2A is applied to three-phase primary winding 9 of three-phase transformer 8. In this case, the stationary magnetic flux shown by the dotted line in FIG. 2C has been generated at three-phase transformer 8. The three-phase alternating voltage is expressed by the three sinusoidal waveforms shifted by 120 degrees to one another. Since the stationary magnetic flux is obtained by time-integrating the alternating voltage, the phase of the stationary magnetic flux is advanced by 90 degrees relative to the phase of the alternating voltage. The waveform and the timing of the zero point of the alternating voltage and the stationary magnetic flux of each phase are known by control unit 13.

FIG. 2A is shown for reference. In FIGS. 2B-2D, switches 2-4 are opened in the period before A point. Since the interpole capacitors 5-7 are connected in parallel to switches 2-4, respectively, the three-phase alternating voltage is applied to three-phase primary winding 9 of three-phase transformer 8 through interpole capacitors 5-7, even when switches 2-4 are opened. At this time, the phase of the three-phase alternating voltage is delayed by 90 degrees by the interpole capacitors 5-7, and an amplitude of the three-phase alternating voltage is reduced by the interpole capacitors 5-7.

The residual magnetic flux shown by the solid line in FIG. 2C is generated at three-phase transformer 8 at this time as well. By opening switches 2-4 at the above-mentioned timing, the residual magnetic flux of R phase becomes the alternating-current component superposed on the positive direct-current component, and the residual magnetic flux of S phase and T phase becomes the alternating-current component superposed on the negative direct-current component.

When closing command signal φB is output from the accident detector, control unit 13 causes switch 2 to be thrown at the timing when the stationary magnetic flux and the residual magnetic flux of R phase are coincident with each other (A point). In addition, in order to cause switch 2 to be thrown at that timing, control unit 13 causes switch 2 to start the closing operation at the timing preceding that timing by the throwing time. When switch 2 is thrown, the magnetic flux of R phase will turn into the stationary magnetic flux instantaneously. It can thus prevent that the transient phenomenon of the magnetic flux of R phase is generated to flow the exciting incoming current into R phase.

On the other hand, since the phases of the AC components are shifted to each other by 120 degrees, as shown in FIG. 2C, the residual magnetic flux of S phase and the residual magnetic flux of T phase have some difference at the throwing moment (A point) of R phase even when the direct-current components are substantially the same. After A point, the phases of S phase and T phase are coincident with each other where they shift from R phase by 180 degrees while the absolute values of the magnetic flux of S phase and T phase are not coincident with each other.

In this state, if switches 3 and 4, corresponding to S phase and T phase, are thrown at the zero point of the alternating voltage of R phase (the time of B point in the figure corresponds to this point), as expressed in the above-mentioned patent documents 1 and 2, the stationary magnetic flux and the residual magnetic flux will not be coincident with each other in at least one of S phase and T phase, resulting in the transient phenomenon of the magnetic flux is generated to produce the exciting incoming current.

According to the present inventor's wholehearted study, the difference between the absolute values of the magnetic fluxes of S phase and T phase after switch 2 of R phase are thrown at A point is generated under an influence of the interpole capacitors 5-7. When there are no interpole capacitors 5-7, after A point, the sum of the magnetic flux of S phase and the magnetic flux of T phase serves as the magnetic flux of R phase, and both the absolute values of the magnetic fluxes of S phase and T phase become one half of the absolute value of the magnetic flux of R phase.

When there are interpole capacitors 5-7, after A point, the sum of the magnetic flux of S phase and the magnetic flux of T phase is the magnetic flux of R phase, and the absolute value of the magnetic flux of S phase becomes smaller than the absolute value of the magnetic flux of T phase. The absolute value of the magnetic flux of the next phase in a phase sequence (in this case, S phase) following the reference phase which is thrown initially (for example, R phase) becomes smaller than the absolute value of the magnetic flux of the further next phase in the phase sequence (in this case, T phase). For this reason, by causing switches 3 and 4 of S phase and T phase to be thrown at the timing (C point) which is delayed from B point by a predetermined angle of between 0-30 degrees (15 degrees in the figure), the difference between the stationary magnetic flux and the residual magnetic flux in S phase and T phase can be made minimum to prevent the exciting incoming current from being generated.

FIG. 3 shows the relation between the throwing phase angle (deg) of switches 3 and 4 of S phase and T phase and the exciting incoming current in the case where the capacity value of interpole capacitors 5-7 is varied in three steps, large, medium and small, within the practical usage range. The angle of throwing at B point of FIGS. 2A-2D is set to 0 degree. It has been proven from FIG. 3 that the exciting incoming current can be suppressed to minimum by throwing switches 3 and 4 with a delay of 0-30 degrees, more preferably 5-20 degrees, from B point.

It has also been proven by performing similar experiments that the exciting incoming current can be suppressed to minimum by throwing switches 3 and 4 with a delay of 0-10 degrees from B point when the capacity value of each of interpole capacitors 5-7 is 0-2000 pF.

It has also been proven that the exciting incoming current can be suppressed to minimum by throwing switches 3 and 4 with a delay of 10-20 degrees from B point when the capacity value of each of interpole capacitors 5-7 is 2000-6000 pF.

It has also been proven that the exciting incoming current can be suppressed to minimum by throwing switches 3 and 4 with a delay of 20-30 degrees from B point when the capacity value of each of interpole capacitors 5-7 is 6000-12000 pF. Note that, in the present embodiment, in analysis, when the capacity value of each of interpole capacitors 5-7 is set to not less than 12000 pF, a magnetic saturation of an iron core of transformer 8 occurs, which makes it difficult to obtain the effect of suppressing the exciting incoming current.

Figure 4A:
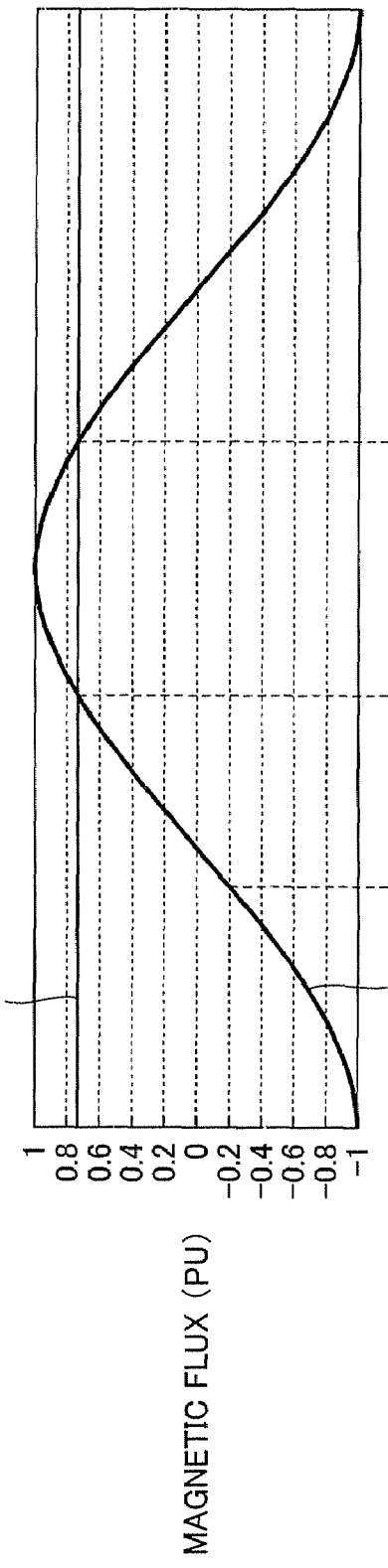
FIG. 4A and FIG. 4B are the time charts for explaining the throwing timing of the switch of R phase shown in FIG. 1.
Figure 4B:
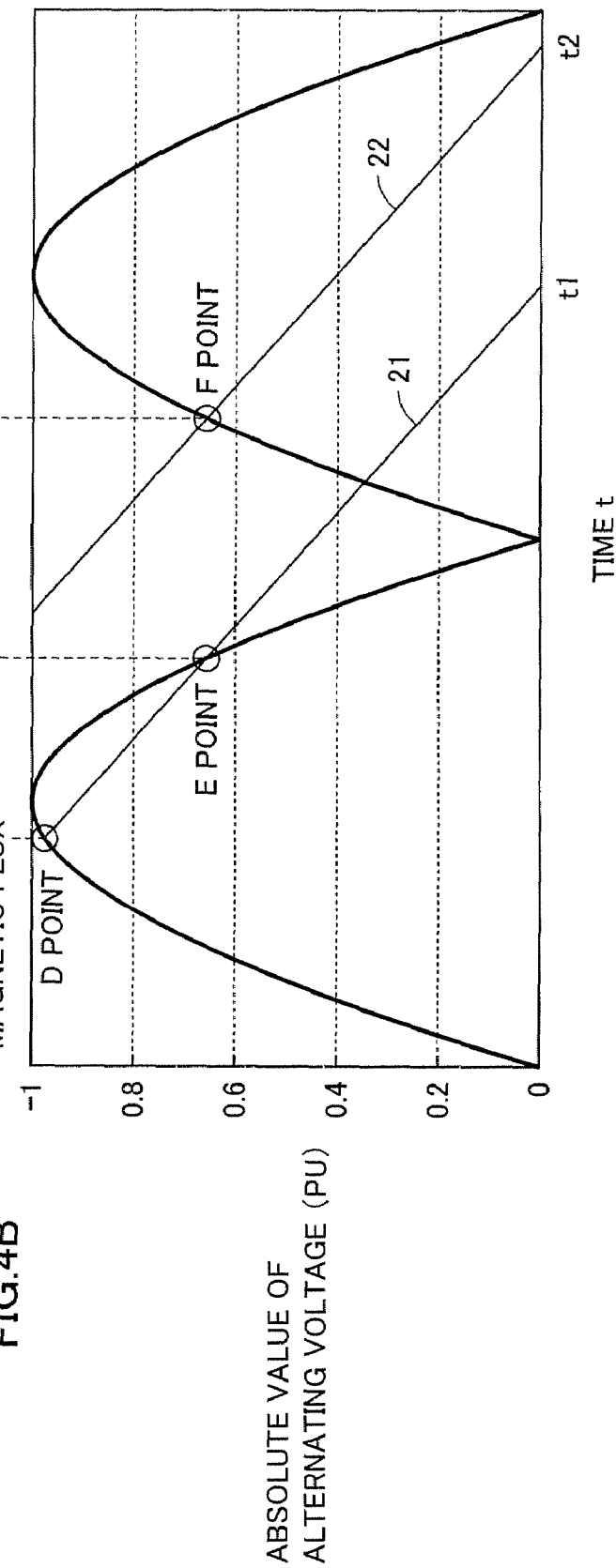

Note that switch 2 of R phase is preferably thrown during a period when the absolute value of the alternating voltage of R phase increases. FIG. 4A is a time chart showing the stationary magnetic flux and the residual magnetic flux of R phase, and FIG. 4B is a time chart showing the absolute value of the alternating voltage of R phase. Note that the residual magnetic flux is set to a constant value for simplification of explanation.

In FIG. 4A and FIG. 4B, the stationary magnetic flux and the residual magnetic flux of R phase are coincident with each other at two points, i.e., at E point before the peak of the stationary magnetic flux and at F point after the peak of the stationary magnetic flux. Now an RDDS (Rate of Decay of Dielectric Strength) curve 21 which passes E point and another RDDS curve 22 which passes F point are written in FIG. 4B. The times t1 and t2, where RDDS curves 21 and 22 intersect with a time-axis represent the times when switch 2 closes mechanically. In other words, if control unit 13 issues an instruction for switch 2 to close at the time which precedes t1 and t2 by the closing time of switch 2, the pre arc will be generated at E point and F point, respectively, and switch 2 is thrown.

However, as seen in FIG. 4B, RDDS curve 22 which passes F point intersects with a curve for showing the absolute value of the alternating voltage only at F point, while RDDS curve 21 intersects with a curve for showing the absolute value of the alternating voltage at two points, D point and E point.

Therefore, if an instruction to close switch 2 at time t1 is issued to switch 2 in order to cause switch 2 to be thrown at E point where the stationary magnetic flux and the residual magnetic flux of R phase are coincident with each other, switch 2 is not always thrown at E point but is thrown at D point. In the case where switch 2 is thrown at D point, the stationary magnetic flux and the residual magnetic flux of R phase are not coincident with each other and as a result the transient phenomenon of the magnetic flux is generated to flow the exciting incoming current.

On the other hand, if an instruction to close switch 2 at time t2 is issued to switch 2 in order to cause switch 2 to be thrown at F point where the stationary magnetic flux and the residual magnetic flux of R phase are coincident with each other, switch 2 is always thrown at F point. When switch 2 is thrown at F point, the stationary magnetic flux and the residual magnetic flux of R phase are coincident with each other, the transient phenomenon of the magnetic flux is not generated, and the exciting incoming current does not flow.

As described above, switch 2 of R phase is more preferably thrown at F point in the period when the absolute value of the alternating voltage of R phase increases rather than at E point in the period when the absolute value of the alternating voltage of R phase decreases.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An incoming current suppression device for suppressing an exciting incoming current that flows from a three-phase AC power supply into a three-phase transformer through a three-phase breaker, said three-phase breaker including three switches and three interpole capacitors, one terminal of said three switches receiving alternating voltages of three phases from said three-phase AC power supply, respectively, and other terminals of said three switches being connected to three input terminals of a three-phase primary winding of said three-phase transformer, respectively, and said three interpole capacitors being connected in parallel to said three switches, respectively, a stationary magnetic flux being generated at each phase of said three-phase transformer when said three-phase breaker is closed, and a residual magnetic flux being generated at each phase of said three-phase transformer when said three-phase breaker is opened, and said incoming current suppression device comprising:

a voltage measuring unit for measuring a voltage of the other terminal of one of the three switches corresponding to a reference phase of three phases;

a magnetic flux operation unit for determining the residual magnetic flux of said reference phase of said three-phase transformer based on the measurement result from said voltage measuring unit at the time when said three-phase breaker is opened; and a control unit, responsive to a closing command signal, for causing one of the three switches corresponding to said reference phase to be thrown at a timing when the stationary magnetic flux of said reference phase and the residual magnetic flux determined by said residual magnetic flux operation unit are coincident with each other, then subsequently causing the two remaining switches to be thrown at a timing which is delayed from a zero point of the alternating voltage of said reference phase by a predetermined phase angle of between 0-30 degrees such that a difference between the stationary magnetic flux and the residual magnetic flux of each phase other than said reference phase is minimum.

2. The incoming current suppression device according to claim 1, wherein said predetermined phase angle increases according to a capacity value of each of said three interpole capacitors.

3. The incoming current suppression device according to claim 2, wherein said predetermined phase angle is set to a value between 0-10 degrees when the capacity value of each of said three interpole capacitors is not more than 2000 pF, said predetermined phase angle is set to a value between 10-20 degrees when the capacity value of each of said three interpole capacitors is between 2000-6000 pF, said predetermined phase angle is set to a value between 20-30 degrees when the capacity value of each of said three interpole capacitors is not less than 6000 pF.

4. The incoming current suppression device according to claim 1, wherein said control unit causes the one of the three switches corresponding to said reference phase to be thrown at the timing when the stationary magnetic flux and the residual magnetic flux of said reference phase are coincident with each other in a period when an absolute value of the alternating voltage of said reference phase increases.

* * * * *